Patented Mar. 13, 1928.

1,662,182

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR TREATING RUBBER WITH ALDEHYDE DERIVATIVES AND PRODUCTS.

No Drawing. Application filed May 14, 1926. Serial No. 109,178.

This invention relates to a process for treating rubber with aldehyde derivatives and to the products of the process, more particularly to a process for treating unvulcanized rubber with materials adapted to retard deterioration by oxidation, which materials also have the property of accelerating vulcanization, and is a continuation in part of my application Serial No. 656,453, filed August 8, 1923.

It appears that rubber undergoes deterioration due principally to two causes, one oxidation, and the other over-vulcanization, or continuance of vulcanization past the optimum point. The present invention is directed more specifically to retarding deterioration due to oxidation.

The principal object of the invention is to provide a simple process for retarding the deterioration, through oxidation, of rubber in which retarding material may be added before vulcanization to preserve the rubber or similar material while in the raw or vulcanized state, the retarding material also being capable of acting as an accelerator of vulcanization when the rubber is vulcanized. Another object of the invention is to provide a series of useful, inexpensive products resulting from such process.

As disclosed in my Patent No. 1,417,970, May 30, 1922, I have found that certain aldehyde amine condensation products which are accelerators of vulcanization give good aging results when used as accelerators, and as disclosed in my copending application Serial No. 641,764, filed May 26, 1923, which issued on May 3, 1927 as Patent #1,627,230, I have also found that these derivatives are best prepared in neutral or slightly acid solution. I have now found that if such a derivative is added to unvulcanized rubber in an amount in excess of that ordinarily required for rapid vulcanization to soft rubber, the age resisting qualities of the unvulcanized or vulcanized rubber are greatly increased while at the same time in the case of vulcanized rubber overvulcanization does not occur if the content of sulphur is limited.

The invention accordingly comprises a process for retarding the deterioration of rubber through oxidation, which includes combining in excess with rubber before vulcanization a substance having the properties of both accelerating vulcanization and retarding deterioration, which latter property persists during and after vulcanization, and which may be utilized during the manufacture of rubber articles.

Numerous tests have shown that for instance 0.3% by weight of the acetaldehyde aniline condensation product prepared in neutral or weakly acid solution, when employed in a rubber compound containing a small percentage of filler, is approximately the largest amount to be employed to secure the greatest increase in rate of vulcanization per pound of accelerator used. If now the percent of accelerator employed is increased to 0.6% it will be found that there is not a corresponding increase in the rate of vulcanization per pound of accelerator as is found in varying the accelerator from 0.0 to 0.3%. The amount 0.3% just mentioned is not rigidly adhered to ordinarily, due to the fact that other factors, such as a high percentage of filler in the compound or a neccessity to speed up the operation due to a limited amount of equipment may cause the use of larger amounts of accelerator, but in my experience the amount of the condensate employed for acceleration, in practice, does not exceed 1%, for soft vulcanized rubber. Any amount above 1% of accelerator, in practice, is therefore considered an excess for a compound containing only sufficient sulphur for soft vulcanization and when the expression "an excess of an agent having the properties of an accelerator and a retarder of deterioration" or similar expression is employed in the claims, I mean a quantity greater than approximately 1% based on the total weight of the compound. With the larger amounts the retarding of deterioration is more clearly shown.

In carrying out the invention employing a substance which is a combined accelerator of vulcanization and a retarder of deterioration the following is an example: 100 parts of rubber, 10 parts of zinc oxide, 3 parts of sulphur, 10 parts of accelerating condensation product of acetaldehyde and aniline are mixed on the mill in the usual manner, and vulcanized for 30 min. under 40 pounds steam pressure. The vulcanized rubber resists deterioration 300% better than a similarly prepared compound containing only one-half part of the condensation product, namely, the amount required for acceleration.

As a further example employing the accelerating condensation product of acetaldehyde and aniline, a stock was prepared containing 100 parts rubber, 10 parts zinc oxide, 3 parts sulphur, and one-half part of the accelerating acetaldehyde-aniline condensation product. After curing for 60 minutes at 40 pounds steam pressure this stock gave a tensile of 3630 pounds. After aging for 3 hours at 235° F. this stock had a tensile of 2555 pounds per square inch. A similar stock containing one part of the accelerating condensate and cured under the same conditions gave a tensile of 3780 pounds, thus showing that the additional one-half part of the accelerating condensate did not appreciably improve the state of vulcanization. However, when this second stock was aged simultaneously with the first one, for 3 hours at 235° F, the tensile obtained was 3295 pounds. This example clearly shows that, while the additional half part of accelerating condensate had practically no effect upon the state of the cure, it had a great effect upon the resistance to aging.

As additional evidence what the property of improved aging persists in the vulcanized stock when an excess of the accelerating condensate is used, a stock was mixed containing 100 parts of rubber, 10 parts of zinc oxide, 3 parts of sulphur and an excess of accelerating condensation product, and this stock was vulcanized in the usual manner and then extracted with benzol. A vulcanized low sulphur stock which was dipped into this benzol extract had its aging properties considerably improved.

As showing that the mere addition of any accelerator in excess will not give improved aging results, the following example is given. Stocks were prepared consisting of 100 parts rubber, 10 parts zinc oxide, 3 of sulphur and ½, 2, 4, 6 and 8 parts respectively of each of various accelerators, such as the condensation product of heptaldehyde and aniline, diphenyl-guanidine, and hexamethylenetetramine. The stocks were vulcanized in the usual manner and aged at 212° F., and in each case the stock containing only one-half part of the accelerator aged better than the stocks containing a larger amount. However, when similar stocks were made up containing respectively ½, 2, 4, 6 and 8 parts of the accelerating acetaldehyde-aniline condensation product, it was found that the improvement in aging was directly proportional to the amount of the accelerating condensation product used.

Another method of carrying out the invention is to prepare a compound consisting of 100 parts of rubber, 10 parts of zinc oxide, 3 parts of sulphur and expose this compound in sheets .030 of an inch thick or less to vapors of aniline at 140° F. for 20 minutes, thereafter the compound is maintained in the vapors of acetaldehyde at ordinary temperatures for 20 minutes. The aniline and acetaldehyde are absorbed by the rubber and react in it to form a condensation product. The treated rubber is allowed to stand for 2 hours in order to allow the complete absorption of all the chemicals. Thereafter it is vulcanized for 60 min. under 40 pounds steam pressure. When this rubber is subjected to the aging test such as set forth above, it shows a greatly improved resistance to deterioration.

The following substances, among others, which have the property of accelerating vulcanization, have been found to also possess the property of retarding deterioration by aging when used in excess. 2 mols of acetaldehyde combined with 1 mol of aniline, or 1 mol of acetaldehyde combined with 2 mols of aniline, acetaldehyde orthotoluidine, acetaldehyde paratoluidine, acetaldehyde monomethylaniline and acetaldehyde paraphenylene diamine, all of these compounds being prepared in neutral or slightly acid solution.

With the above disclosure it is obvious that modifications will suggest themselves to those skilled in the art, and it is not desired to limit the invention otherwise than as set forth in the appended claims.

Having thus described my invention, what I claim and desire to protect by Letters Patent is:

1. A process for retarding the deterioration, of rubber which comprises combining with rubber an excess of a condensation product having the dual properties of an accelerator and a retarder of deterioration, and soft vulcanizing the rubber.

2. A process for retarding the deterioration, of rubber which comprises combining with rubber, zinc in combination, sulphur and more than 1% of the accelerating condensation product of acetaldehyde and aniline based on the total weight of rubber, zinc in combination and sulphur, and soft vulcanizing the rubber.

3. A process for retarding the deterioration, of rubber which comprises combining with rubber, vulcanizing material and an excess of an accelerating acetaldehyde amine condensate prepared in neutral or slightly acid solution.

4. A process for retarding the deterioration, of rubber which comprises combining with rubber vulcanizing material and more than 1% of the accelerating condensation product of acetaldehyde and aniline prepared in a neutral or slightly acid solution, and vulcanizing the rubber.

5. A process for retarding the deterioration of rubber which comprises combining with rubber a vulcanizing agent and an aldehyde-amine condensation product having both the properties of an accelerator and a retarder of deterioration, the latter being added in quantity considerably in excess of that required for accelerating the soft vulcanization of the rubber by the vulcanizing agent, whereby the balance may function as a deterioration retarder, and soft vulcanizing the rubber.

6. Soft vulcanized rubber derived from rubber combined with an excess of an agent adapted to accelerate vulcanization and to retard deterioration.

7. Soft vulcanized rubber derived from rubber, zinc in combination, sulphur and more than 1% of an accelerating acetaldehyde-aniline condensate based on the total weight of the rubber, zinc in combination and sulphur.

Signed at New York, county and State of New York, this 13th day of May, 1926.

SIDNEY M. CADWELL.